April 2, 1963     T. F. SARAH     3,083,929
STARWHEEL DRAG BRAKE ASSEMBLY
Filed Nov. 14, 1960
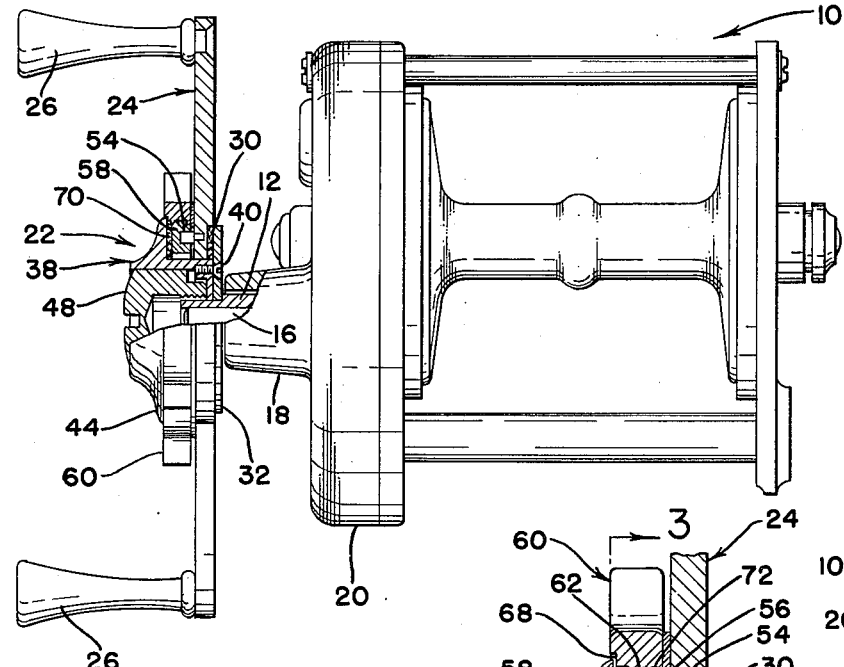
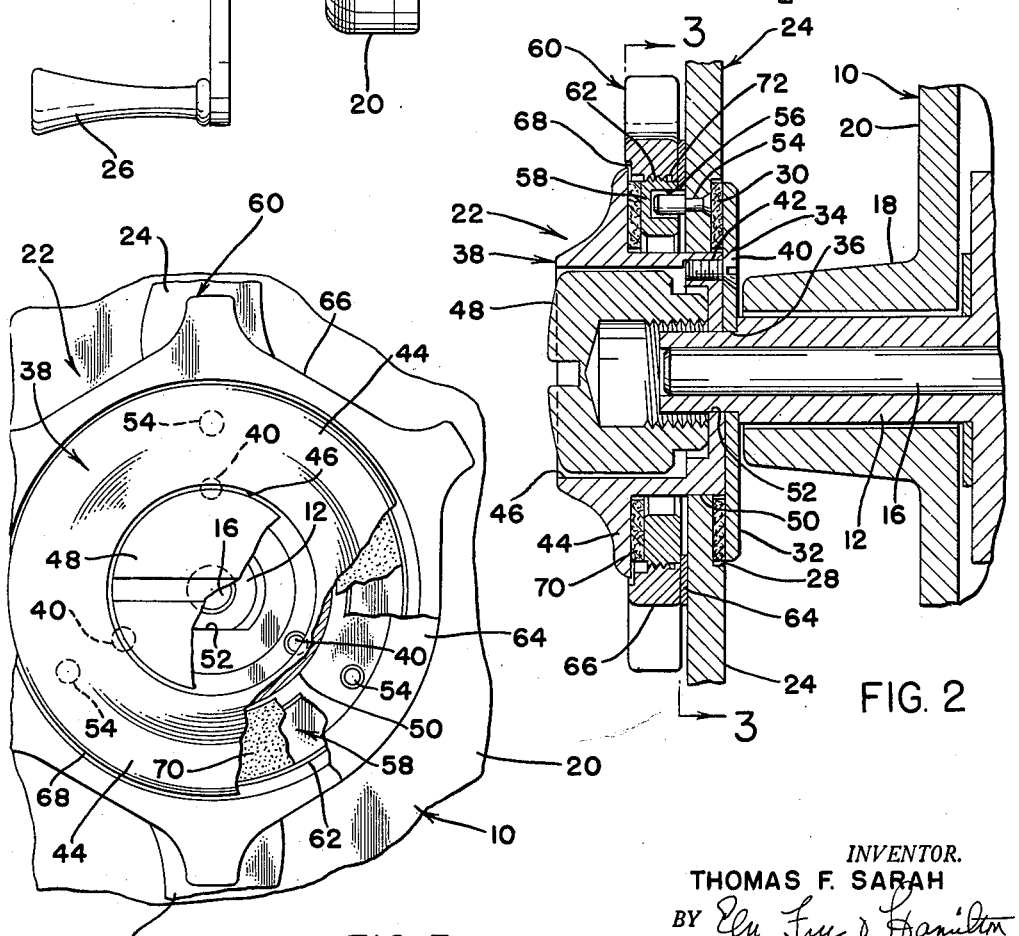
INVENTOR.
THOMAS F. SARAH
BY Ely, Frye & Hamilton
ATTORNEYS 3,083,929
STARWHEEL DRAG BRAKE ASSEMBLY
Thomas F. Sarah, Akron, Ohio, assignor to The Enterprise Manufacturing Company, Akron, Ohio, a corporation of Ohio
Filed Nov. 14, 1960, Ser. No. 68,719
1 Claim. (Cl. 242—84.45)

The invention relates to fishing reels, and more specifically, to an improved drag brake assembly which may be readily attached to an existing reel.

An object of the invention is to provide a starwheel adjustment type of drag brake assembly which is easily operated without the aid of any tools.

Another object of the invention is to provide an improved drag brake assembly of relative simplicity and one which will not appreciably add to the bulk weight of the existing reel to which it may be attached.

A further object of the invention is to provide the novel drag brake assembly with the maximum area of drag for its size without increasing the overall diameter of the starwheel adjustment to the point of being cumbersome upon the reel.

Other objects inherent in the nature of the improved construction will be apparent to the skilled craftsman from the description of the preferred embodiment illustrated in the drawings which follows. Obviously, the construction shown may be varied in many respects without departing from the scope of the invention defined in the claim.

In the drawings:

FIG. 1 is an elevation view partially broken away and in section of the novel drag assembly, and a part sectional view of the drive gear shank of a fishing reel to which the drag assembly is attached.

FIG. 2 is an enlargement of a sectional elevation of the drag brake assembly and the drive gear shank to which it is attachable.

FIG. 3 is an end elevation taken substantially along line 3—3 of FIG. 2, showing parts broken away.

FIG. 1 is an exemplification of the manner in which the novel drag brake assembly may be attached to a fishing reel 10. Obviously, the size of the reel and the type may vary widely, and the application of the invention is not limited to the type of reel shown.

The relative sizes of the reel 10 and the drag brake assembly, as attached, may also be observed from FIG. 1.

The drag brake assembly is attachable to the shank 12 of the drive gear (not shown), the shank being rotatable upon cog post 16. The cog post and shank project outwardly through the end of collar 18 of the reel cap 20.

The complete drag brake assembly, indicated generally at 22, preferably includes the hand crank 24 and handles 26, in order to make it easier for the fisherman to apply to his existing reel by simply removing the old hand crank. However, the skilled mechanic will recognize that it is possible to apply the drag brake assembly so as to utilize the existing hand crank.

In the preferred construction a recess 28 is provided within the central face of the hand crank 24 on the side proximate to the collar 18. A friction washer 30, which may be made of a composition or any other suitable material, is disposed within the recess and in face-to-face relationship with the hand crank.

A metal plate 32, having the same diameter as the friction washer 30, abuts washer 30 and may also fit partially within the recess 28. Plate 32 is provided with countersunk apertures 34 spaced at intervals around its surface. A center aperture 36 in plate 32 has the configuration of a quadrilateral with two arcuate sides through which passes the end of the drive gear shank 12 having a matching configuration, for splining plate 32 on shank 12. The shank 12 has screw threads between the flat sides thereof.

The metal plate 32 is connected to a cup-shaped member 38 by screws 40 which fit flush with the outer surface of plate 32 and project through the countersunk apertures 34 into threaded apertures 42 in the cup-shaped member 38.

The cup-shaped member 38 is provided with an annular flange or plate 44 which serves a purpose to be described later. The interior of the member is substantially hollow, and provides a recess 46 within which fits the crank nut 48, which confines the member 38 and the novel drag brake assembly upon the threaded end of the drive gear shank 12. The reduced sleeve portion 50 of the member 38 is designed to permit a loose turning fit with respect to the hand crank 24. A center aperture 52 of a similar configuration as center aperture 36 in the metal plate 32 is provided within the end of the member 38 to also spline member 38 on the end of the drive gear shank 12.

The side of the hand crank 24 opposite to that of recess 28 has pins 54 which project outwardly at spaced intervals around its hub. The pins 54 are adapted to slide into recesses 56 of the metal ring 58. The outer periphery of the ring 58 is threaded to a starwheel adjusting nut 60, as indicated at 62. Both the starwheel nut and ring are spaced from the hand crank 24 by a metal washer 64, which permits the starwheel nut to turn with respect to the hand crank.

The outer periphery of the starwheel nut is substantially hexagonal in configuration with arcuate sides 66 as may be observed from FIG. 3. The arcuate sides permit the fisherman to readily grasp the nut 60 with his fingers to make the desired adjustment without the aid of tools. The starwheel nut is provided with a slight annular recess 68 into which fits the outer peripheral edge portion of the cup-shaped member 38.

Disposed between the ring 58 and the abutting surface of flange 44 on the cup-shaped member 38 is another friction washer 70 which is fabricated from the same material as friction washer 30.

The operation of the starwheel drag brake assembly when attached to a reel is as follows:

When the starwheel adjusting nut 60 is turned clockwise as viewed in FIG. 3 the ring 58 is moved away from the hand crank 24, compressing friction washer 70 against the flange-like abutting surface on flange 44 on the cup-shaped member 38, the latter pulling, in effect, the metal plate 32 against the friction washer 30. The combined effect offers frictional resistance to the rotation of the hand crank. When the starwheel nut is turned in the opposite direction the ring is moved back toward the hand crank. To prevent the ring from being backed too far, an annular gap 72 is provided within the starwheel nut which serves as a stop.

Thus the spool on the reel may be driven through the novel drag brake assembly 22. If the pull exerted upon a line (not shown), such as by a fish should be greater than the adjusted resistance offered to the hand crank by the friction washers, the spool of the reel will turn relative to the hand crank.

What is claimed is:

In a reel having a drive gear shank, a drag brake assembly mounted on said drive gear shank, comprising:
a hand crank for connection to said drive gear shank;
pin means connected to said hand crank and projecting outwardly therefrom at equally spaced intervals;
means axially slidable on said pin means;
friction means disposed in face-to-face relationship with said slidable means;

abutment means circumferentially parallel with said slidable means and rotatable with respect thereto;

means disposed on the opposite side of said hand crank connected to said abutment means and secured to said drive gear shank;

a second friction means interposed between said hand crank and said means disposed on the opposite side of said hand crank;

and an adjustment means threaded to and surrounding said slidable means and adapted to cause said slidable means to press the first said friction means against said abutment means and to cause said second friction means to be pressed against said hand crank to offer resistance to the rotation of the hand crank relative to said drive gear shank.

References Cited in the file of this patent

UNITED STATES PATENTS

| | | |
|---|---|---|
| 1,603,306 | Adams | Oct. 19, 1926 |
| 1,731,208 | Adams | Oct. 8, 1929 |